(12) United States Patent
Korst et al.

(10) Patent No.: US 9,843,541 B2
(45) Date of Patent: Dec. 12, 2017

(54) RECOMMENDER SYSTEM AND METHOD OF OPERATING SAME

(75) Inventors: Jan Korst, Eindhoven (NL); Mauro Barbieri, Eindhoven (NL); Serverius Petrus Paulus Pronk, Vught (NL)

(73) Assignee: FUNKE DIGITAL TV GUIDE GMBH, Berlin (DE)

(*) Notice: Subject to any disclaimer, the term of this patent is extended or adjusted under 35 U.S.C. 154(b) by 15 days.

(21) Appl. No.: 14/127,751

(22) PCT Filed: Jun. 29, 2012

(86) PCT No.: PCT/EP2012/062743
§ 371 (c)(1),
(2), (4) Date: Dec. 19, 2013

(87) PCT Pub. No.: WO2013/004627
PCT Pub. Date: Jan. 10, 2013

(65) Prior Publication Data
US 2014/0115082 A1    Apr. 24, 2014

(30) Foreign Application Priority Data

Jul. 1, 2011 (EP) .................................. 11172447
Jan. 25, 2012 (EP) .................................. 12152412

(51) Int. Cl.
*G06F 15/16* (2006.01)
*H04L 12/58* (2006.01)
*G06Q 30/02* (2012.01)

(52) U.S. Cl.
CPC ........... *H04L 51/046* (2013.01); *G06Q 30/02* (2013.01)

(58) Field of Classification Search
CPC .... G06Q 30/02; G06Q 50/01; G06Q 30/0241; G06Q 30/0269; G06Q 30/0277;
(Continued)

(56) References Cited

U.S. PATENT DOCUMENTS

2005/0027821 A1* 2/2005 Alexander ............. G06Q 30/02
709/218
2008/0162260 A1* 7/2008 Rohan .................... G06Q 30/02
705/14.4
(Continued)

FOREIGN PATENT DOCUMENTS

WO    2010/122448 A1    10/2010

OTHER PUBLICATIONS

Mitra Pinaki, et al; "Targeted advertising for online social networks"; Networked Digital Technologies, 2009, First International Conference on IEEE; Jul. 28, 2009; pp. 366-372; whole document.

*Primary Examiner* — Dustin Nguyen
*Assistant Examiner* — Hao Nguyen
(74) *Attorney, Agent, or Firm* — Ware, Fressola, Maguire & Barber LLP

(57) ABSTRACT

The present invention relates to a method of operating a recommender system arranged for being coupled to a computer implemented social network (200). The present invention furthermore relates to a corresponding computer program and to a corresponding recommender system (100) arranged for being coupled to a computer implemented social network (200). In particular, the present invention relates to a recommender system (100) being configured to provide a recommendation (172) relating to a content item being highly discussed in the social network (200), without the recommendation being necessarily based on some kind of a correlation between characteristics of a recipient (10) of the recommendation on the one side and characteristics of content items to be recommended and/or characteristics of contacts/friends of the recipient (10) on the other side.

13 Claims, 3 Drawing Sheets

(58) Field of Classification Search
CPC .......... G06Q 30/0226; G06Q 30/0251; G06Q 30/0253; G06Q 30/0256; G06Q 30/0282; G06F 17/30867; G06F 17/30598; G06F 17/3089
USPC ...... 709/206, 217, 218; 705/14.4, 26.7, 319, 705/347; 707/738, 753
See application file for complete search history.

(56) References Cited

U.S. PATENT DOCUMENTS

| | | | |
|---|---|---|---|
| 2010/0088187 A1 | 4/2010 | Courtney et al. | |
| 2010/0205541 A1* | 8/2010 | Rapaport | G06Q 10/10 715/753 |
| 2010/0306249 A1* | 12/2010 | Hill | G06F 17/30867 707/769 |
| 2012/0005224 A1* | 1/2012 | Ahrens | G06Q 10/10 707/769 |
| 2012/0036084 A1* | 2/2012 | Barbieri | G06Q 30/0282 705/347 |
| 2012/0191776 A1* | 7/2012 | Ruffner | G06F 17/30873 709/204 |
| 2013/0204740 A1* | 8/2013 | Barbieri | G06Q 30/0631 705/26.7 |

* cited by examiner

RECOMMENDER SYSTEM AND METHOD OF OPERATING SAME

CROSS REFERENCE TO RELATED APPLICATIONS

This application is the U.S. National Stage of International Application Number PCT/EP2012/062743 filed on Jun. 29, 2012 which was published in English on Jan. 10, 2013 under International Publication Number WO 2013/004627. This application is also claiming priority under 35 USC §119 to European Patent Application No. 11172447.2 filed on Jul. 1, 2011 and European patent application 12152412.8 filed on Jan. 25, 2012. All three applications are hereby incorporated by reference in their entirety.

FIELD OF THE INVENTION

The present invention relates to a method of operating a recommender system arranged for being coupled to a computer implemented social network. The present invention furthermore relates to a corresponding computer program and to a corresponding recommender system arranged for being coupled to a computer implemented social network. In particular, the present invention relates to a recommender system being configured to provide a recommendation relating to a content item that is highly discussed between members of the social network.

BACKGROUND OF THE INVENTION

Recommender systems are used for automatically presenting a recommendation relating to a content item, such as a product, a video, a journal, a TV program, a song etc. available online, to a user. As a user is confronted with a large amount of content items that are offered in various databases, he/she can have severe difficulties in finding content items of interest. A recommender system facilitates retrieving content items that are of interest for the user and avoid the need to perform complex searches. For instance, international patent application publication WO 2010/122448 A1 describes such a recommender system.

There are different approaches of designing a recommender system. One approach results in a content-based recommender system and another approach in a collaborative-filtering-based recommender system.

A content-based recommender system recommends a content item being represented as multiple features to a user, if this feature representation corresponds to the user's preferences, which are also expressed in terms of these features.

A collaborative-filtering-based recommender system analyses the purchase/viewing/listening history of a comparatively large set of users in order to identify a similarity between content items and a similarity between users. For instance, new content items offered in a content item database that are similar to items that a user likes are recommended to the user. Or, new items that are liked by some users that are similar to a certain user are recommended to the certain user. Usually, a collaborative-filtering-based recommender system does not require specific information on content items themselves other than purchase/viewing/listening information from users.

Besides recommendations that are solely and automatically generated by recommender systems, a user can submit a personal recommendation to one of his contacts. For instance, a presentation of a content item in the internet is often accompanied by a so-called "tell-a-friend" button that a user can click on and thereby submit a link, i.e. a web address, to the representation of the content item and eventually a personal note to one or more of his contacts.

Recommender systems are known that are adapted to promote such personal recommendations or semi-personal recommendations. For instance, a recommender system is known that recommends an item to a user, if one of the contacts of the user has positively rated the item. Such semi-personal recommendation can also be generated, if the contact of the user has only implicitly expressed that he likes a content item. For instance, a recommender system of the user recognises that the user likes or dislikes a certain content item and forwards this recognition in the form of a recommendation to all contacts of the user, thereby informing all contacts of the user that the user likes/dislikes a certain content item. The recognition, whether the user likes/dislikes a certain content item can also be based on an explicit rating the user has submitted in relation to this certain content item.

SUMMARY OF THE INVENTION

It is a technical object of the present invention to provide technical means for automatically informing a user of a computer implemented social network about a topic that is highly discussed in the social network.

According to a first aspect of the present invention, the above identified technical object is achieved by a method of operating a recommender system arranged for being coupled to a computer implemented social network, the method comprising the steps of:
monitoring communication messages exchanged between users of the social network,
detecting, in a first of the monitored communication messages, a content item identifier identifying a content item,
scanning further monitored communication messages for detecting the same or other content item identifiers identifying the same content item,
registering a number of the detected content item identifiers, and
generating a recommendation message in dependence of the registered number and sending the recommendation message to a designated recipient for recommending the content item to the designated recipient.

The invention includes the recognition that, in the outcome, all of the aforementioned prior art automatic recommending mechanisms are based on a correlation between characteristics of a recipient of a recommendation on the one side and characteristics of content items to be recommended and/or characteristics of contacts/friends of the recipient on the other side. However, a certain content item can be of interest to a user, even though there is no a-priori correlation between the certain content item and the user. Such a content item can be a highly discussed video, book etc. available online. In other words, it is not the content of a message—and thus a message iself—that is recommended to a designated recipient but an item that is frequently mentioned in messages exchanged in a community (social network) the designated recipient belongs to.

The operating method of the first aspect of the present invention forms an alternative approach of generating recommendation in the context of social networks. That approach does initially not correlate with the personal taste/personal preferences of the designated recipient, but nevertheless results in a recommendation method that is of potential high interest for the designated recipient.

Through the operating method, the designated recipient is automatically informed without delay about the content item being related to a highly discussed topic, for instance a video about a public event. Thereby, the designated recipient does not need to search himself for such highly discussed topic but is automatically informed. Therefore, no electric energy consumption that would be involved in performing such personal searching and no associated network load is caused. In other words: Network load is reduced, since individuals do not have to actively search for such "talk-of-the-town" content items. It is likely that the designated recipient will reduce the time he/she is operating a technical apparatus for accessing the computer implemented social network for searching for highly discussed topics, as he/she can proceed on the assumption to be regularly and automatically informed about such highly discussed topics in the form of a corresponding electronic recommendation message. The aforementioned advantages become particularly apparent, if it is taken into account that the operating method can be implemented such that the recommendation message reaches a plurality of users.

Generally spoken, content items, in particular video content items, can quickly increase in popularity, e.g., whenever a person recommends a content item to his friends/contacts, and those to their respective friends/contacts etc. For instance, if the item that is available at a content item database, such as YouTube, a person needs always to send a web address link associated with that video item to his contacts for these contacts to be able to watch the video item. Thus, a popular video item can raise a sharp increase of interest due to such personal recommendations. This particularly holds true for a video item that relates to a recent public event. However, the designated recipient may not be aware of such a recent event that is highly discussed and such unawareness can result in an embarrassing situation for the designated recipient. The operating method of the first aspect of the present invention can avoid such embarrassing situation for the designated recipient by automatically informing him about a highly discussed topic in the form of a corresponding recommendation message.

Another advantage of the operation method is that the designated recipient can be the first of a user community to be automatically informed about such highly discussed topic. After having been informed/recommended, the designated recipient can then inform others of the community about this highly discussed topic. Such spread of information can be rewarding for the designated recipient.

The communication messages to be monitored can comprise at least one of a text message, an e-mail, a recommendation, an exchange forum share, and a short message service message. For instance, a user exchange forum is accessed and the monitoring step is performed on communication messages exchanged within the user exchange forum.

The content item identifier is, e.g., an internet link pointing to the content item, an electronic program guide (EPG) link, or a character string naming a feature of the content item, such as a title, a main actor or a name of an event.

The computer implemented social network is to be understood to follow its standard definition in the field of information and communication technology. Thus, a computer implemented social network is a computer network that allows participation of a plurality of users, wherein each user can set up a personal list of contacts, wherein each contact of such list is also a participant of the same or another social network.

Once the content item identifier is identified in the first of the monitored communication messages, the further monitored communication messages are scanned for detecting the same or other content item identifiers identifying the same content item. For instance, by monitoring and scanning the communication messages, it is kept track of TV programs and/or video items that are being discussed in the traffic of messages being exchanged among associated friends in the social network. In an embodiment, this is realized by identifying a title of a TV program in the exchanged messages. Alternatively or additionally, a relating link, i.e., web address, is detected in the exchanged communication messages. For instance, links to video items can be recognized as such. Alternatively or additionally, if the computer implemented social network is coupled with an Electronic Program Guide (EPG) service, users can explicitly link the exchanged communication messages with content items in the EPG.

Within or after the scanning step, the number of detected content item identifiers is registered.

In an embodiment, the recommendation message is generated and sent to the designated recipient, if the registered number exceeds a predetermined threshold value.

In a preferred embodiment, the operating method comprises the additional steps of:
  determining a time period between two or more sending instants of two or more monitored communication messages including a detected content item identifier and
  generating and sending the recommendation message in dependence of the registered number and the determined time period.

In this embodiment, a frequency of relevant communication messages exchanged between the users is taken into account. For instance, if such frequency is high or, respectively, if the time period is comparatively low, the content item identified in the two or more monitored communication messages is likely to relate to a highly discussed topic, for instance to a so-called "talk-of-the-town" topic. In an example, about a hundred monitored communication messages exchanged between users of the social network within about one hour result in a generation and sending of a corresponding recommendation message to the designated recipient. If, in another example, only about ten monitored communication messages, exchanged between users within five hours include content item identifiers identifying the same content item, a corresponding recommendation message recommending the content item to the designated recipient is not generated.

In another preferred embodiment, the operating method includes operating a subscriber service. For instance, the method comprises the additional steps of:
  receiving a subscriber information message from a subscriber, the message including a subscriber information identifying at least the subscriber,
  storing the subscriber information in a subscriber list and generating the recommendation message only, if the designated recipient is listed as a subscriber in the subscriber list.

In this embodiment, only such users receive a recommendation message that have subscribed to the described recommendation mechanism.

In a further preferred embodiment the operating method comprises the additional steps of:
  partitioning the social network into logic clusters,
  selecting one or more of the logic clusters and performing the monitoring step only within the selected of the logic clusters.

Such partitioning of the social network facilitates management of counts of detected content item identifiers. For instance, the social network is partitioned into meaningful clusters hierarchies, for instance such that each level is partitioned in subsets of approximately equal size. The social network can also be partitioned using a geographical hierarchy, for instance, continents, country-groups, countries, regions, cities, communities, etc. Also, these two approaches can be combined.

In a particular preferred embodiment, the subscriber information message includes a cluster identifier identifying one or more of the logic clusters. In this embodiment, the selecting step is performed in dependence of the cluster identifier. Thus, messages exchanged in a sub-community of higher relevance for a particular designated recipient are analyzed and the recommendation messages may be more specific to a particular users interest.

For instance, the user of the computer implemented social network can specify within the subscriber information message that he only wishes recommendation that are derived from communication messages that are only exchanged within the geographical cluster "Amsterdam".

In an embodiment, the subscriber specifies within the subscriber information message that he only wishes to receive recommendations for content items that correlate to his personal preferences and/or to a specified genre. In this case, only such communication messages are scanned that correspond to the specified preferences. For instance, the subscriber names a genre into which he/she takes an interest in.

In yet another embodiment, in addition to the location-based hierarchy, it is kept track of message traffic using a hierarchy of general interests in order to tune the talk-of-the-town recommendations to the recipient's personal interest.

In another preferred embodiment, the operating method comprises the step of:
performing the monitoring step for each of the logic clusters,
storing, for each of the logic clusters, a respective list of most occurring video items that are identified in the monitored exchanged communication messages and respective associated registered numbers of the detected video item identifiers, and
sorting each of the stored lists in dependence of the respective registered number of detected content item identifiers.

For instance, the video item that was detected most often in the monitored communication message is named first in each of the stored lists.

In an embodiment, a relatively short list of most occurring video items is stored for the lowest levels of the hierarchy. For each higher level in the hierarchy, a subset of a relatively short list of most occurring video items is determined based on the lists of the child-subsets of the given subset, as it is assumed that top content items at a certain hierarchy level will also occur in the lists at lower hierarchy levels. In that way, it is kept track of "talk-of-the-town" video items on various hierarchy levels, ranging from worldwide to very local.

In a preferred embodiment, a subscriber can specify in the subscriber information message that he only wishes to be recommended of the top-end content items in a list of a specified logic cluster (hierarchy level).

In yet another preferred embodiment, the method comprises the additional steps of:
identifying contacts of the subscriber and storing the identified contacts of the subscriber in the subscriber list, and
performing the monitoring step only on communication messages exchanged between the identified contacts of the subscriber.

This embodiment ensures that the subscriber remains automatically informed about topics that are highly discussed within a selected group of contacts of the subscriber.

In an embodiment, the detecting step includes accessing a content item database and applying a correlation algorithm for determining a correlation between a monitored communication message and a description of at least one of the content items of the content item database. Thereby, a content item identifier can be deducted from a monitored communication message, even though said communication message does not include a direct content item identifier, such as a web address leading to the content item.

In another preferred embodiment, in the registering step, all monitored communication messages that have not been sent to or from the designated recipient are taken into account, in order to avoid self-fulfilling prophecies. For instance, if the designated recipient will recommend the content item that has been recommended to him to his/her contacts, an initially relatively small-scale discussion on a given content item can escalate to a large discussion, partly caused by this "talk-of-the-town" recommendations. One way to avoid this can be achieved by not counting communication messages that are sent by a person that has already received a "talk-of-the-town" recommendation for the content item, preferentially recursively.

In another preferred embodiment, the recommendation message is generated by including a text message indicating the registered number to the recipient. In this way, the designated recipient is provided with some sort of a justification why he/she has been provided with the recommendation message.

According to a second aspect of the present invention, the above identified technical object is achieved by a computer program. The computer program for operating a recommender system arranged for being coupled to a computer implemented social network comprises computer program code means for causing the recommender system to carry out the steps of the method of the first aspect of the invention, when the computer program is run on a computer controlling the recommender system.

According to a third aspect of the present invention, the above identified technical object is achieved by a recommender system arranged for being coupled to a computer implemented social network, the recommender system comprising:
a monitoring unit configured to monitor communication messages exchanged between users of the social network,
a detector coupled to the monitoring unit and configured to detect, in a first of the monitored communication messages, a content item identifier identifying a content item,
a scanner coupled to the monitoring unit and to the detector and configured to scan further monitored communication messages for detecting the same or other content item identifiers identifying the same content item,
a counter coupled to the scanner and configured to register a number of the detected content item identifiers, and a sender configured to generate a recommendation message in dependence of the registered number and to send the recommendation message to a designated recipient for recommending the content item to the designated recipient.

Principally, the recommender system of the third aspect of the present invention shares the advantages of the operating method of the first aspect of the present invention. In particular, the recommender system has preferred embodiments that correspond to the additional features/steps explained above within the description of preferred embodiments of the operating method. For instance, the recommender system comprises a timer that is coupled to the sender and to the scanner and that is configured to determine a time period between two or more sending instants of two or more monitored communication messages each including a detected content item identifier. The sender is preferentially configured to generate the recommendation additionally in dependence of the determined time period, wherein a short time period, i.e. a high frequency of exchanged messages promotes generation and sending of the recommendation message and wherein a comparatively low frequency, i.e. high time period, rather prevents generation and sending of a recommendation message. It is furthermore preferred that the recommender system comprises a memory for storing subscriber information, such as an information related to a logic cluster of the social network and/or information related to user preferences of the designated recipient, such that a recommendation message can be provided to the designated recipient in dependence of the information included in the subscriber information message.

In an embodiment, the recommender system is configured to generate an appropriate talk-of-the-town recommendation by monitoring an amount of message traffic on a world-wide-scale, on a national-scale, on a regional scale, as well as on the scale of a direct community of friends of the designated recipient. For instance, a TV program is identified as being of national scale, if it generates substantially more traffic on a national scale than on a world-wide scale (or alternatively, than in neighbouring countries). In a similar fashion, if a video item generates much more traffic between the designated user's direct friends, than, e.g., on a regional or national scale, then the recommender system identifies it as something specific for the community of friends.

In summary, it shall be understood that the operating method of the first aspect of the invention, the computer program of the second aspect of the invention and the recommender system of the third aspect of the invention have similar and/or identical preferred embodiments, in particular, as defined in the dependent claims.

It shall be understood that a preferred embodiment of the invention can also be any combination of the dependent claims with the respective independent claim.

These and other aspects of the invention will be apparent from and elucidated with reference to the embodiments described hereinafter.

DESCRIPTION OF EMBODIMENTS

Figure 1:
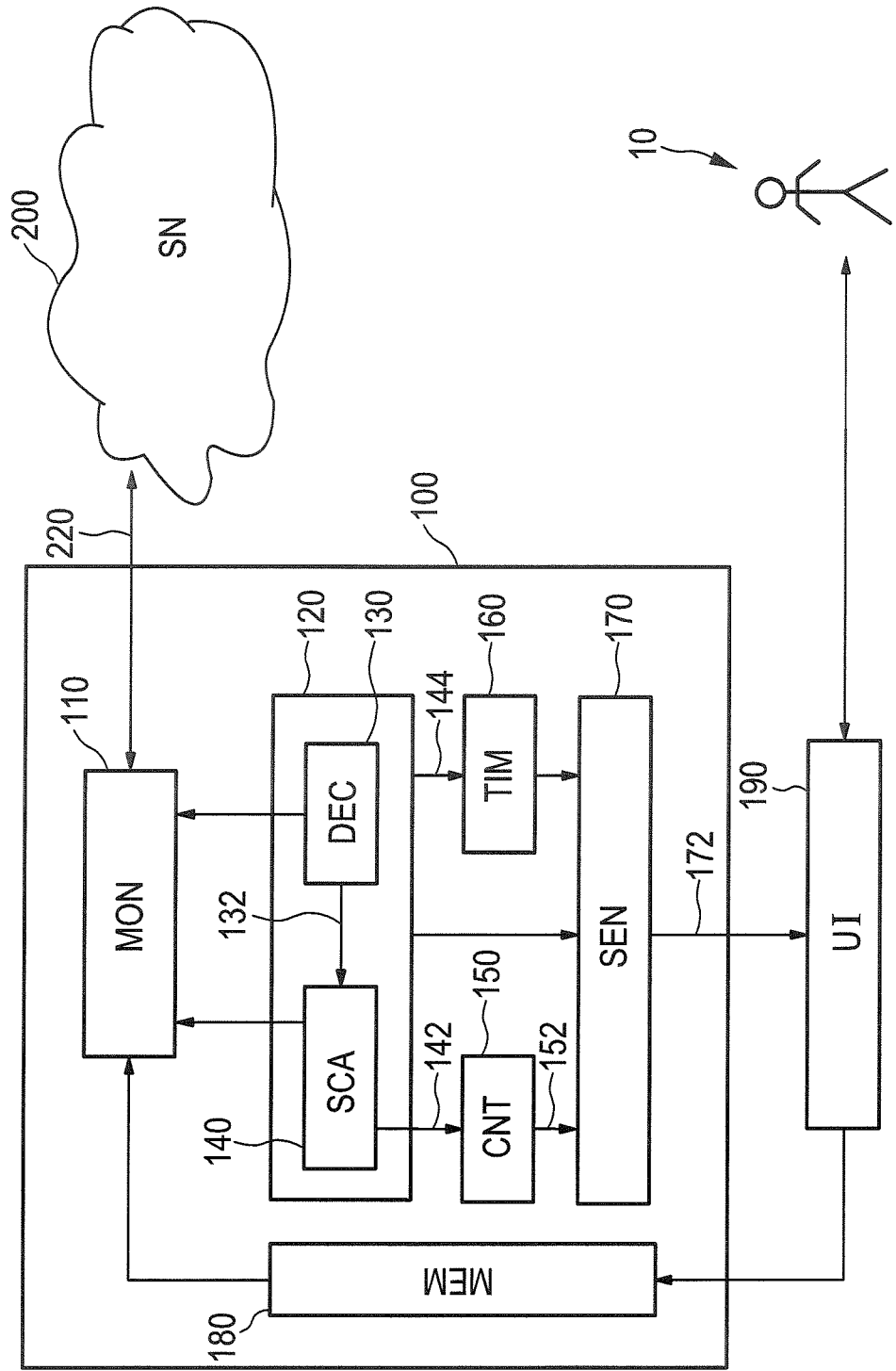
FIG. 1 shows exemplary and schematically a block diagram representation of a recommender system in accordance with the third aspect of the present invention.

FIG. 1 shows schematically and exemplary a block diagram representation of a recommender system 100 in accordance with the third aspect of the present invention. The recommender system 100 comprises a monitoring unit 110 that monitors communication messages 220 exchanged between users of a computer implemented social network 200 in order to inform a designated recipient 10 about a talk-of-the-town topic for instance a video item relating to a recent public event.

Figure 2:
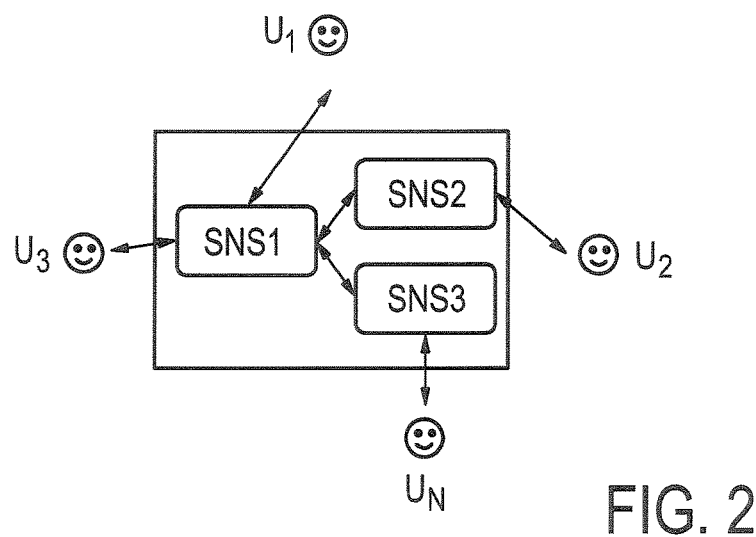
FIG. 2 shows schematically and exemplary a block diagram representation of a social network.

A possible principle architecture of the social network 200 is depicted in FIG. 2. A set of social network services SN1, SN2, SN3, . . . represent the social network infrastructure. Users $U_1, U_2, U_3, \ldots U_n$ connect to one of the servers SN1, SN2, SN3, . . . using a client device and a corresponding application, e.g. a web browser running on a personal computer, a mobile phone application running on a smart phone, etc. Communication messages exchanged between the users are sent to a server from a sending user and delivered to a receiving user through one or more servers belonging to the social network infrastructure. Examples of such infrastructure are: A web service of social networks such as Facebook, e-mail servers, short message service servers. An identification of communication messages exchanges by a group of users pertaining to video items can be carried out in one or more of the servers of the infrastructure.

For providing talk-of-the-town recommendation messages 142 to the designated recipient 10, the recommender system 100 comprises a detector 130 that is coupled to the monitoring unit 110 and that detects, in a first of the monitored communication messages, a content item identifier 132 that identifies a content item. Such content item identifier can be, for instance, an internet link pointing to a content item (web address), an electronic program guide (EPG) link, or a character string naming a feature of the content item, such as a title, a main actor, or a name of an event. For detecting such content item identifier, the detector 130 can optionally access a content item database and apply a correlation algorithm for determining a correlation between a monitored communication message and a description of one of the content items of the content item database.

The detected content item identifier 132 is forwarded to a scanner 140 of the recommender system 100.

The scanner 140 is coupled both to the detector 130 and to the monitoring unit 110. It scans further monitored communication messages for detecting the same content item identifier or another content item identifier identifying the same content item.

The detected content item identifiers referring to a common content item are counted by a counter 150 of the recommender system 100 and the total number of detected content item identifiers is registered by the counter 150. In dependence of the registered number 152, a sender 170 of the recommender system 100 generates a recommendation message 172 and sends the recommendation message 172 to the designated recipient 10 in order to recommend the content item to the designated recipient. For instance, the recommendation message is generated, if the registered number exceeds a predetermined threshold value within a predetermined time period. The sender 170 can therefore comprise a comparison unit in order to compare the registered number 152 with the predetermined threshold value. The chosen threshold value may depend on the category of the identified content item. The actual threshold value may be based on experimental evaluation, or it may be personalized, by learning an appropriate value from user feedback.

As the frequency of communication messages including content item identifiers referring to a common content item can indicate, whether or not the content item relates to a talk-of-the-town topic or not, the recommender system 100 can additionally comprise, as depicted, a timer 160 that is coupled to the scanner 140 and the detector 130 and determines a time period between two or more sending instants of two or more monitored communication messages that each include a detected content item identifier. The sender 170 is additionally coupled to the timer 160 and generates the recommendation message 172 also in dependence of the determined time period. If the time period is high, i.e. the frequency of relevant communication messages low, generation of the recommendation message 172 will rather not occur. If, in the other case, the time period is rather low, i.e. the frequency of relevant communication messages high, generation of the recommendation message is promoted.

Figure 3:
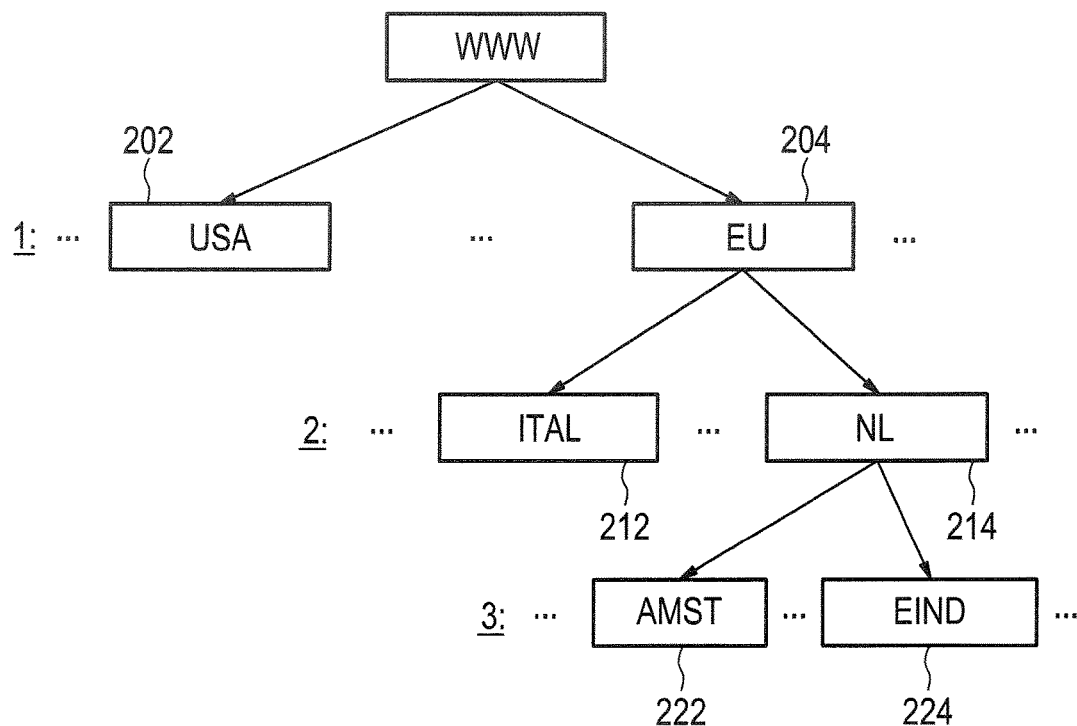
FIG. 3 shows exemplary and schematically a block diagram representation of a plurality of logic clusters of a social network.

In order to keep the administration of monitoring, detecting, scanning and counting relevant communication messages simple, the recommender system 100 can partition the social network 200 into meaningful clusters hierarchically, as indicated in FIG. 3. For instance, the recommender system 100 separates the social network, 200 into a plurality of logic clusters 202, 204, 212, 214, 222, 224, . . . , wherein each logical cluster is arranged at a certain geographical level (continent, country, region, city, community, . . . ) and each logical cluster relates to a certain geographical region. As indicated in FIG. 3, the recommender system 100 separates the social network 200 into continents at a first level (USA, EU), into countries at a second level (ITAL, NL, . . . ) and, on a third level, into city regions, such as Amsterdam (AMST, 222) and Eindhoven (EIND, 224).

The recommender system 100 administrates, for each logical cluster, of the lowest level (third level: city regions) a comparatively short list of most occurring content items. In addition, for each higher level in the hierarchy, the recommender system 100 determines for each logical cluster a comparatively short list of most occurring content items based on the lists of the child-logical clusters for a given logical cluster, assuming that the top items at a given level will also occur in the lists at a lower level. In this way, it is kept track of talk-of-the-town content items on various levels, ranging from worldwide to very local. Furthermore, the recommender system 100 can administrate, for each logical cluster, several lists, e.g., one for each content item genre.

The separation of the social network 200 into a plurality of logical clusters has the additional advantage that the designated recipient 110 can submit a subscriber information message to the recommender system 100, for instance through a user interface 190 coupled to the recommender system 100, wherein the subscriber information message can include a cluster identifier identifying one or more of the logic clusters. For instance, the designated recipient 10 wishes only to be informed about very local talk-of-the-town topics, for instance only talk-of-the-town topics that are discussed in the city region Eindhoven (EIND, 224). Or, the designated recipient 10 is alternatively or additionally interested into talk-of-the-town topics there are discussed in other regions, for instance in a particular region of the United States of America, or he/she is interested in talk-of-the-town topics that are discussed worldwide. For storing such subscriber information, the recommender system 100 additionally comprises a memory 180 that is coupled to the monitoring unit 110. The monitoring unit 110 can read the subscriber information and monitor communication messages of logic clusters that are specified in the subscriber information message. Furthermore, the designated recipient 10 can indicate, in which genre he is interested in and can furthermore name other user preferences that are taken into account by the monitoring unit 110. Only such communication messages exchanged within the social network 200 are monitored that correspond to the subscriber information stored in the memory 180. In a further example, the designated recipient 10 can indicate in the subscriber information message that he only wishes communication messages to be monitored that are exchanged between selected users of the social network 200.

Figure 4:
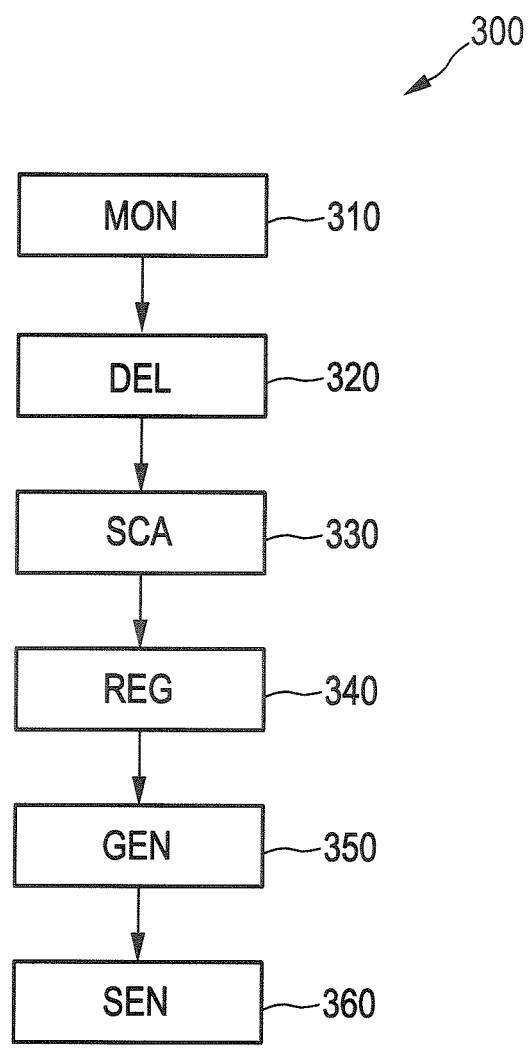
FIG. 4 shows a flowchart that schematically represents an operating method in accordance with the first aspect of the present invention.

FIG. 4 shows a flowchart illustrating an operating method of operating a recommender system arranged for being coupled to a computer implemented social network 200 in accordance with the first aspect of the present invention. Principally, the steps of the operating method 300 correspond to components of the recommender system 100 depicted in FIG. 1. For instance, the recommender system 100 depicted in FIG. 1 can be operated according to the operating method 300 depicted in FIG. 4.

In a first step 310, communication messages exchanged between users $U_1, U_2, \ldots U_n$ of the social network 200 are monitored. In a second step 320, a content item identifier identifying the content item is detected in a first of the monitored communication messages.

After detection, further monitored communication messages are scanned in a third step 330 for detecting the same or other content item identifiers identifying the same content item. The number of detected content item identifiers is counted and registered in step 340.

In steps 350 and 360, a recommendation message is generated in dependence of the registered number of detected content item identifiers referring to a common content item and sent to a designated recipient for recommending the content item to the designated recipient. As has already explained with respect to FIG. 1, the recommendation message is generated, if the number of detected content item identifiers is sufficiently high enough and, optionally, if sufficient high number of relevant communication messages have been exchanged in a predetermined amount of time. Thereby, the designated recipient is automatically informed about talk-of-the-town topics.

In summary, the present invention relates to a method of operating a recommender system arranged for being coupled to a computer implemented social network. The present invention furthermore relates to a corresponding computer program and to a corresponding recommender system arranged for being coupled to a computer implemented social network. In particular, the present invention relates to a recommender system being configured to provide a recommendation relating to a content item being highly discussed in the social network, without the recommendation being necessarily based on some kind of a correlation between characteristics of a recipient of the recommendation on the one side and characteristics of content items to be recommended and/or characteristics of contacts/friends of the recipient on the other side.

It shall be understood that an arrangement of elements of a respective figure predominately serves a purpose of an evident description; it does not relate to any actual geometric arrangement of parts of a manufactured device according to the invention. Referring in particular to the circuit device, the described inverters can be installed inside the circuit device are be arranged in close or far distance to the circuit device.

In the claims, the word "comprising" does not exclude other elements or steps, and the indefinite article "a" or "an" does not exclude a plurality.

A single unit or device may fulfil the functions of several items recited in the claims. The mere fact that certain measures are recited in mutually different dependent claims does not indicate that a combination of these measures cannot be used to advantage. Any reference signs in the claims should not be construed as limiting the scope.

The computer program of the second aspect of the invention may be stored/distributed on a suitable medium, such as an optical storage medium or a solid-state medium supplied together with or as part of other hardware, but may also be distributed in other forms, such as via the Internet or other wired or wireless telecommunication systems.

What is claimed is:

1. A method of operating a recommender system arranged for being coupled to a computer implemented social network the method for generating and sending a recommendation message for a content item to a designated recipient, wherein the designated recipient is a user of the social network, the method comprising:
    monitoring communication messages exchanged between users of the social network,
    detecting, in a first of the monitored communication messages, a content item identifier identifying a content item, wherein said detecting is performed on content items having characteristics that have no a-priori correlation to characteristics of the designated recipient nor to known contacts of the designated recipient among other users of the social network,
    scanning further monitored communication messages for detecting the same or other content item identifiers identifying the same content item,
    counting a number of the detected content item identifiers, wherein, recursively, communication messages that are sent by those of said users of the social network that already received a recommendation message for said content item are not counted,
    registering said number of the detected content item identifiers, wherein only those monitored communication messages that have been sent neither to nor from said designated recipient are taken into account in said registering,
    in dependence of the registered numbers generating a recommendation message for said content item and sending the recommendation message for said content item to the designated recipient for recommending the content item to the designated recipient, and
    further comprising the additional steps of:
    partitioning the social network into logic clusters,
    selecting one or more of the logic clusters, and
    performing the monitoring step only within the selected logic clusters.

2. The method of claim 1, comprising the additional steps of:
    determining a time period between two or more sending instants of two or more monitored communication messages including a detected content item identifier, and
    generating and sending the recommendation message in dependence of the registered number and the determined time period.

3. The method of claim 1, comprising the additional steps of:
    receiving a subscriber information message from a subscriber, the message including a subscriber information identifying at least the subscriber,
    storing the subscriber information in a subscriber list, and
    generating the recommendation message only, if the designated recipient is listed as the subscriber in the subscriber list.

4. The method of claim 1, wherein
    the subscriber information includes a cluster identifier identifying one or more of the logic clusters, and wherein
    the selecting step is performed in dependence of the cluster identifier.

5. The method of claim 3, comprising the additionally steps of:
    identifying contacts of the subscriber and storing the identified contacts of the subscriber in the subscriber list, and
    performing the monitoring step only on communication messages exchanged between the identified contacts of the subscriber.

6. The method of claim 1, wherein the detecting step includes accessing a content item database and applying a correlation algorithm for determining a correlation between content of a monitored communication message and a description of at least one of the content items of the content item database.

7. The method of claim 1, comprising the step of:
    accessing a user exchange forum, wherein the monitoring step is performed on communication messages exchanged within the user exchange forum.

8. The method of claim 1, wherein the content item is a video item.

9. The method of claim 1, wherein the monitored communication messages comprise at least one of a text message, an e-mail, a recommendation, an exchange forum share, and a short message service message.

10. The method of claim 1, wherein the content item identifiers comprise at least one of an internet link pointing to the content item, an electronic program guide link, and a character string naming a feature of the content item, such as a title, a main actor, or a name of an event.

11. The method of claim 1, wherein the generating step comprises:
    including a text message indicating the registered number to the recipient.

12. A non-transitory medium including computer program code for operating a recommender system arranged for being coupled to a computer implemented social network, the medium and the computer program code configured to, with a computer controlling the recommender system, cause the recommender system to carry out the steps of the method as defined in claim 1, when the computer program is run on the computer controlling the recommender system.

13. A recommender system for generating and sending a recommendation message for a content item to a designated recipient, wherein the designated recipient is a user of a computer-implemented social network, the recommender system arranged for being coupled to the computer implemented social network, and comprising:
    a monitoring unit configured to partition the social network into logic clusters, select one or more of the logic clusters, and monitor communication messages exchanged between users of the social network only within the selected logic clusters, a detector coupled to the monitoring unit and configured to detect, in a first of the monitored communication messages, a content item identifier identifying a content item, wherein said detecting is performed on content items having characteristics that have no a-priori correlation to characteristics of the designated recipient nor to known contacts of the designated recipient among other users of the social network, a scanner coupled to the monitoring unit and to the detector and configured to scan further monitored communication messages for detecting the same or other content item identifiers identifying the same content item, a counter coupled to the scanner and configured to count and register a number of the detected content item identifiers, wherein, recursively, communication messages that are sent by those of said users of the social network that already received a recommendation message for said content item are not counted, and wherein only monitored communication messages that have been sent neither to nor from said designated recipient are taken into account in said registering, and a sender configured to generate a recommendation message for said content item in dependence of the registered number and to send the recommendation message for said content item to the designated recipient for recommending the content item to the designated recipient.

* * * * *